Aug. 26, 1958     L. A. CUMMARO     2,849,046

INSERT FOR SOFT MATERIALS AND LOCKING MEMBER THEREFOR

Original Filed Aug. 10, 1953

INVENTOR.
LOUIS A. CUMMARO
BY
*Buckhorn, Cheatham & Blore*
ATTORNEYS

United States Patent Office 2,849,046
Patented Aug. 26, 1958

2,849,046

INSERT FOR SOFT MATERIALS AND LOCKING MEMBER THEREFOR

Louis A. Cummaro, Monterey, Mass., assignor to Phillips Screw Company, New York, N. Y., a corporation of Delaware Original application August 10, 1953, Serial No. 373,322. Divided and this application April 9, 1957, Serial No. 651,716

5 Claims. (Cl. 151—41.73)

The present invention relates to means for providing anchors for fastening elements in bodies of soft material, and more particularly to inserts adapted for installation in a body of soft material and a locking member therefor. The present application is a division of my co-pending application Serial No. 373,322, filed August 10, 1953.

Because of their light weight and other desirable properties, many soft materials such as aluminum and magnesium alloys, plastics and various ply materials are being used extensively today in the construction of various items. The softness of these materials is a disadvantage, however, when a bolted or screwed connection must be made thereto since tapped holes in such material are easily stripped or galled or otherwise damaged upon installation or removal of a screw or bolt. It has been customary, therefore, to install an anchor of a suitable material, called an "insert," in the body of soft material and to which a threaded connection may be made without fear of damaging or galling threads in the parent body. The insert devices heretofore provided are complicated in structure and expensive to manufacture. Moreover, they are difficult to install or to remove, once installed.

It is an object of the invention to provide a new and improved insert device that may be easily and quickly installed in a parent body of soft material.

It is another object of the invention to provide a new and improved anchoring insert that may be easily and cheaply manufactured.

Other objects and advantages of the invention will become apparent hereinafter.

In accordance with the present invention, an insert member is provided having external screw threads adapted to fit the threads of an aperture formed in a parent body. A cooperative locking member is provided for the insert, including a ring portion adapted to be mounted in the body aperture coaxially with the insert, the insert and locking member having cooperating tang and notch means formed on their adjacent portions whereby the locking member and insert are locked against relative rotation. The locking member is also provided with tooth means adapted to groove the walls of the body aperture whereby the entire assembly is locked against rotation relative to the parent body.

For a more detailed description of the invention, reference is made to the accompanying drawings and explanation thereof. In the drawings.

Figure 1:
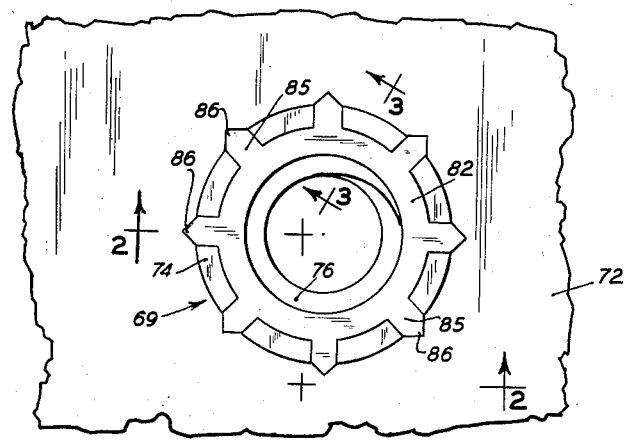
Fig. 1 is a plan view showing a modified insert and locking member installed in a parent body of material.
Figure 2:
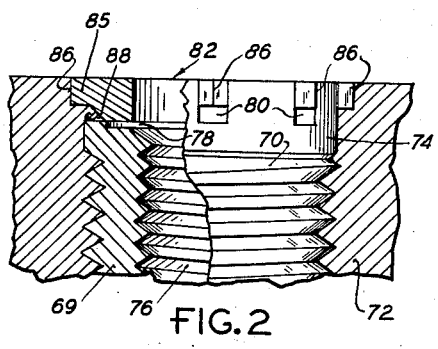
Fig. 2 is a view taken substantially along line 2—2 of Fig. 1.
Figure 3:
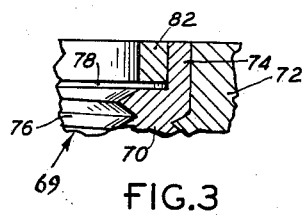
Fig. 3 is a fragmentary view of the insert of Fig. 1 taken substantially along line 3—3 of Fig. 1.

Shown in Figs. 1, 2 and 3 is a tubular insert 69, preferably formed of a relatively hard metal, such as, for example, steel.

The insert 69 comprises a threaded inner section 70 adapted to be screwed into a cooperatively threaded socket formed in a parent body 72 of soft material. The outer end of the insert 69 comprises a substantially cylindrical collar section 74 adapted to fit within a thread-relieved or counterbored portion of the parent body socket. The insert 69 is provided with internal threads 76 adapted to receive a stud or the like, and is formed with an enlarged counterbore or circular central aperture 78 within the collar section of the insert. The collar of the insert is provided with a plurality of radially spaced, axially directed notches or slots 80 extending inwardly of its free end and having a predetermined axial length.

The insert 69 is adapted to be locked to the parent body 72 by means of a locking member comprising a ring portion 82 adapted to fit cooperatively within the aperture 78 of the insert. The internal diameter of the ring portion is at least as great as the root diameter of the internal threads 76 so that a stud or other threaded member may be inserted through the ring portion 82 for engagement with the internal threads of the insert. Extending outwardly from the ring portion 82 are a plurality of tangs or teeth adapted to engage within the slots 80 upon relative axial movement between the insert and locking member. As may be seen in Figs. 1 and 2, the tangs 85 extend outwardly beyond the outer periphery of the insert, the outwardly extending portions defining tooth portions 86 adapted to groove the wall of the counterbore upon installation of the locking member. As shown in Fig. 2, the lower surface of each of the tangs 85 is inclined upwardly relative to the inner end of the ring portion 82 in a direction outwardly from the ring portion whereby the portion of the tangs next adjacent the ring portion 82 engages in the slot 80 before the tooth portion 86 engages the surface of the body 72 to assure alignment of the tangs with the notches of the insert. This arrangement, in effect, provides a guide means on the lower end of the locking member. Preferably, the notches or slots 80 are of a greater depth than the axial length of the tooth portions 86 to provide a clearance space 88 for the chip cut from the body portion by the tooth portion as the locking member is engaged with an insert. As is evident, the engagement of the teeth of the tooth portion with the parent body effectively restrains the insert against torsional movement while the engagement of the threads of the insert with the threads of the parent body restrains the insert from longitudinal displacement relative to the parent body.

An insert such as illustrated in Figs. 1 through 3 may be removed by drilling inwardly of the assembly with a drill having a diameter substantially equal to the outer diameter of the collar 74 of the insert to a depth equal to the height of the collar, thus severing the locking relation between the tangs 85 of the locking member with the insert 69 whereby the insert may be removed by use of an "easy-out" tool.

A new insert and locking member may be replaced in the former aperture or the aperture enlarged for installation of an insert of larger size.

Having illustrated and described preferred embodiments of the invention, it should be apparent to those skilled in the art that the invention permits of modification in arrangements and details. I claim as my invention all such modifications as come within the true spirit and scope of the appended claims.

I claim:

1. The combination comprising a hollow, externally threaded insert adapted for installation in a body formed with a screw-threaded socket, one end of said insert being provided with a coaxial counterbore, the walls of said insert defining said counterbore being slotted from said one end, and a locking member comprising a ring portion adapted to fit within said counterbore and a plurality of teeth extending from said ring portion and adapted to be received within said slots, said teeth being adapted to extend outwardly of said insert and to project into said parent body upon engagement of said locking member and said insert to lock the same against rotation relative to said parent body.

2. In combination, an insert adapted for installation in a body formed with a screw-threaded and counterbored socket, said insert including a threaded section adapted to be screwed into the screw-threaded portion of said socket, and a cylindrical collar section adapted to fit within the counterbored portion of said socket, said collar having a plurality of radially spaced, axially directed slots extending inwardly from the free end thereof and having a circular central aperture, and a locking member comprising a ring portion adapted cooperatively to fit within said aperture and a plurality of radially spaced teeth extending outwardly from said ring portion adapted to fit within said slots upon relative axial movement between said insert and said locking member, said teeth being of greater length in a direction at right angles to the axis of said ring portion than the thickness of said collar section whereby said teeth project beyond the outer periphery of said collar section and are adapted to be pressed into said parent body upon engagement of said locking member and said insert to lock the same against rotation relative to said parent body.

3. In an anchoring device, the combination comprising a tubular insert adapted for installation in a body formed with a screw-threaded socket and a locking member for said insert, said insert being formed with external threads on its inner end adapted to fit the threads of said socket and having a plurality of relatively narrow, radially spaced end slots in its outer end, said locking member comprising a ring portion adapted to fit within said outer end of said insert in coaxial relation therewith and a plurality of tang means extending radially outwardly of said ring and adapted to engage cooperatively in said slots, at least one of said tang means extending outwardly from the outer periphery of said insert and defining a tooth portion adapted to groove the wall of said socket surrounding said outer end to lock said insert against rotation, said notches being of substantially greater axial length than the axial length of said tang means to provide clearance for the material of said parent body removed by the grooving action of said tooth portions.

4. In an anchoring device, the combination comprising an externally threaded tubular insert adapted for installation in a body formed with a cooperatively screw-threaded socket and a locking member for said insert, said insert having a plurality of relatively narrow, radially spaced notches in the wall thereof extending inwardly of its outer end, said locking member comprising a portion adapted to be received within said outer end of said insert and a plurality of tang means extending radially outwardly of said portion and adapted to engage cooperatively in said notches, at least one of said tang means extending outwardly from the outer periphery of said insert and defining a tooth portion adapted to groove the wall of said socket surrounding said outer end to lock said insert against rotation.

5. In an anchoring device, the combination comprising an externally threaded tubular insert adapted for installation in a body formed with a screw-threaded socket and a locking member for said insert, said insert having a plurality of radially spaced notches in the outer end thereof, said locking member comprising a ring portion adapted to fit within the aperture of said insert adjacent said outer end in coaxial relation therewith and a plurality of tang means extending radially outwardly of said ring portion and adapted to engage cooperatively in said notches, said tang means extending outwardly from the outer periphery of said insert and defining tooth portions adapted to groove the wall of said socket surrounding said outer end to lock said insert against rotation, said tooth portions terminating short of the inner end of said ring to provide a guide portion adapted to be engaged in said insert aperture before said tooth portions engage the outer surface of said body.

References Cited in the file of this patent

UNITED STATES PATENTS 2,545,045    Rosan                Mar. 13, 1951